United States Patent
Cicchitto et al.

(10) Patent No.: US 9,686,273 B2
(45) Date of Patent: Jun. 20, 2017

(54) AGGREGATOR TECHNOLOGY WITHOUT USERNAMES AND PASSWORDS

(71) Applicant: Avatier Corporation, San Ramon, CA (US)

(72) Inventors: Nelson A. Cicchitto, San Ramon, CA (US); Anthony R. T. Simmons, Concord, CA (US)

(73) Assignee: Avatier Corporation, Pleasanton, CA (US)

( * ) Notice: Subject to any disclaimer, the term of this patent is extended or adjusted under 35 U.S.C. 154(b) by 0 days.

(21) Appl. No.: 15/052,747

(22) Filed: Feb. 24, 2016

(65) Prior Publication Data

US 2016/0248756 A1    Aug. 25, 2016

Related U.S. Application Data

(60) Provisional application No. 62/120,153, filed on Feb. 24, 2015.

(51) Int. Cl.
- *G06F 7/04* (2006.01)
- *H04L 9/32* (2006.01)
- *G06F 21/00* (2013.01)
- *H04L 29/06* (2006.01)

(52) U.S. Cl.
CPC ........ *H04L 63/083* (2013.01); *H04L 63/0815* (2013.01)

(58) Field of Classification Search
CPC .......................... H04L 63/083; H04L 63/0815
USPC .................... 726/6, 4, 5; 713/168, 170, 182
See application file for complete search history.

(56) References Cited

U.S. PATENT DOCUMENTS

| | | | |
|---|---|---|---|
| 7,103,666 B2 | 9/2006 | Royer et al. | |
| 7,346,923 B2 | 3/2008 | Atkins et al. | |
| 7,536,389 B1 | 5/2009 | Prabhakar et al. | |
| 8,073,810 B2 | 12/2011 | Maes et al. | |
| 8,533,773 B2 | 9/2013 | Maes et al. | |
| 8,589,338 B2 | 11/2013 | Maes et al. | |
| 2003/0163738 A1 | 8/2003 | Couillard et al. | |
| 2005/0238159 A1 | 10/2005 | Halsell et al. | |
| 2009/0017847 A1 | 1/2009 | Mendiola et al. | |
| 2009/0292814 A1* | 11/2009 | Ting ........................ | G06F 15/16 709/229 |

(Continued)

FOREIGN PATENT DOCUMENTS

EP    1089516 A3    8/2002

*Primary Examiner* — Aravind Moorthy
(74) *Attorney, Agent, or Firm* — Michael A. Glenn; Perkins Coie LLP

(57) ABSTRACT

Techniques are described in which to access a user's web applications, the user registers and signs on to an aggregator system using any supported login identity provider username and password. When the user registers for the first time, the system collects additional information to verify the user for a subsequent access to the system. The system also automatically creates a system secret username and secret, highly securely generated password, both of which are unknown and inaccessible to the user. The secret username and password are stored in an lightweight directory access protocol (LDAP) server or database or in a distributed cloud database system. The system also maps the login identity provider user name to the secret user name and password for subsequent usage.

14 Claims, 14 Drawing Sheets

(56) References Cited

U.S. PATENT DOCUMENTS

| | | | |
|---|---|---|---|
| 2013/0263021 A1* | 10/2013 | Dunn | H04L 12/1827 715/756 |
| 2013/0290475 A1* | 10/2013 | Flagg | H04L 67/18 709/217 |
| 2013/0314208 A1* | 11/2013 | Risheq | G07C 9/00158 340/5.53 |
| 2015/0127678 A1* | 5/2015 | Zhou | G06F 17/30589 707/770 |
| 2016/0173500 A1* | 6/2016 | Sharabi | H04L 63/08 726/5 |

* cited by examiner

AGGREGATOR TECHNOLOGY WITHOUT USERNAMES AND PASSWORDS

CROSS REFERENCE TO RELATED APPLICATIONS

This patent application claims priority from U.S. Provisional Patent Application No. 62/120,153, SOCIAL SINGLE SIGN-ON AGGREGATOR WITHOUT USERNAMES AND PASSWORDS, filed Feb. 24, 2015, the entirety of which is incorporated herein by this reference thereto.

BACKGROUND OF THE INVENTION

Technical Field

This innovation relates generally to the field of automated identity and access management technology. More specifically, this innovation relates to using aggregator technology without usernames and passwords for automating identity and access management.

Background

Many organizations rely on technological identity and access management solutions to keep pace with the growth of their organizations, e.g. gaming and hospitality enterprises. Thus, for example, such organizations deploy automated user de-provisioning or password policy enforcement.

In today's environment, partner enterprises allow an external user from one organization outside of their network to have access to an internal application of their organization within their own network. This type of partnership can be referred to as federated identity management. With using federated identity management, an internal application written at Company A can be made publicly available. For a user at Company B on one type of network to access on an entirely different network the internal application written at Company A, the user has to perform the following procedure. The user creates an internal ID at Company A, enters the internal application and maps his external ID from his own network to his internal ID on Company A's network. Further, Company A can allow the user to access their internal application by the user using a social network account, such as a LinkedIn (Mountain View, Calif.; "LinkedIn") account for example. Then, Company A can link the external user's social network account sign on to Company A's internal application.

The technique described above allows Company A to manage their partners' access to their internal applications.

Today, there's a technology known as federation, which allows an enterprise to manage their partners' access to their internal applications. However, federation requires high maintenance for every partner company and a lot of initial effort to set up and configure.

SUMMARY

Techniques are described in which to access a user's web applications, the user registers and signs on to an aggregator system using any supported login identity provider username and password or other authenticating credentials. When the user registers for the first time, the system collects additional information to verify the user for a subsequent access to the system. The system also automatically creates a system secret or private identity such as a secret username and secret, highly securely generated password, both of which are unknown and inaccessible to the user. The secret identity, such as secret username and password, is stored in an lightweight directory access protocol (LDAP) server or database or in a distributed cloud database system. The system also maps the login identity provider user name to the secret user name and password for subsequent usage.

BRIEF DESCRIPTION OF THE DRAWINGS

One or more embodiments of the present invention are illustrated by way of example and not limitation in the figures of the accompanying drawings.

FIG. 1 illustrates an example of an interface of a user's page of an aggregator platform, according to an embodiment;

FIG. 9 illustrates an example of a user interface of a delegation page in which a user can enter a delegation type, provider type, provider user name, applicable filters, and a selection of one or more applications to share, according to an embodiment;

FIG. 10 illustrates an example of a user interface showing a sample dropdown list of the provider types of FIG. 9, according to an embodiment;

DETAILED DESCRIPTION

Figure 2:
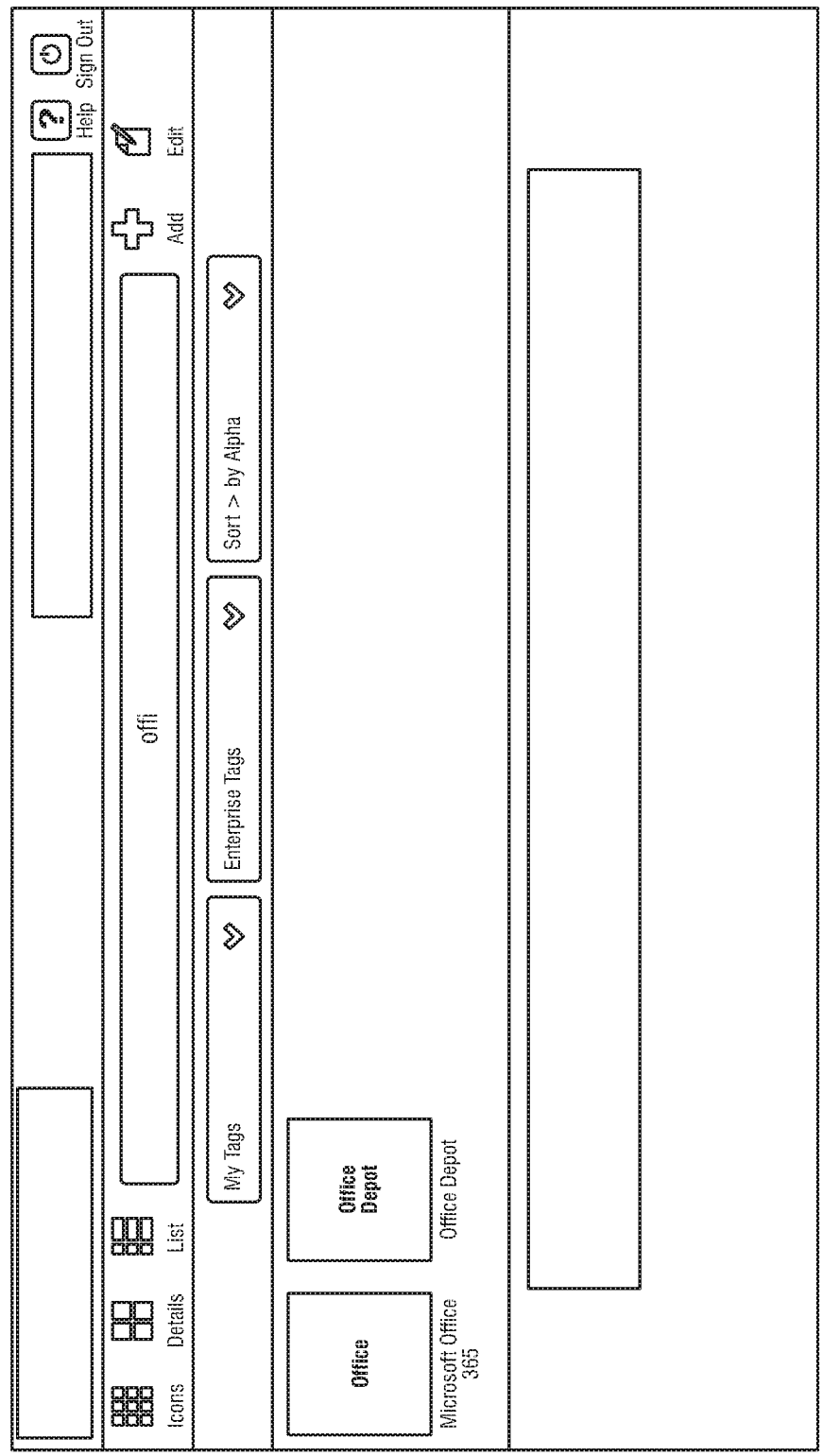
FIG. 2 illustrates an example of a user interface showing two icons representing an enabled application on the aggregator platform and a not-enabled application on the aggregator platform, according to an embodiment.

Introduced here is a technique with which to access a user's web applications. The user registers and signs on to an aggregator system using any supported login identity provider username and password. When the user registers for the first time, the system collects additional information to verify the user for a subsequent access to the system. The system also automatically creates an system secret username and secret, highly securely generated password, both of which are unknown and inaccessible to the user. The secret username and password are stored in an lightweight directory access protocol (LDAP) server or database or in a distributed cloud database system. The system also maps the login identity provider user name to the secret user name and password for subsequent usage.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

An Exemplary Embodiment of an Aggregator Platform without Usernames and Passwords An exemplary embodiment of an aggregator platform without usernames and passwords is a social single sign-on ("sSSO") platform. It should be appreciated that the technique discussed herein can also refer to the aggregator system or application, depending on the context of the discussion. Such platform comprises a server that aggregates a plurality of web applications both internal to an organization and that are public facing to login identity providers including social networking sites such as for example LinkedIn or Facebook (Menlo Park, Calif.; "Facebook"). The platform presents the aggregation of such web applications as links provided to a particular user.

Examples of login identity providers include but are not limited to social networking sites, Linkedin and Facebook. A sample non-exhaustive list can be found in FIG. 4, which is described in further detail below.

Figure 1:
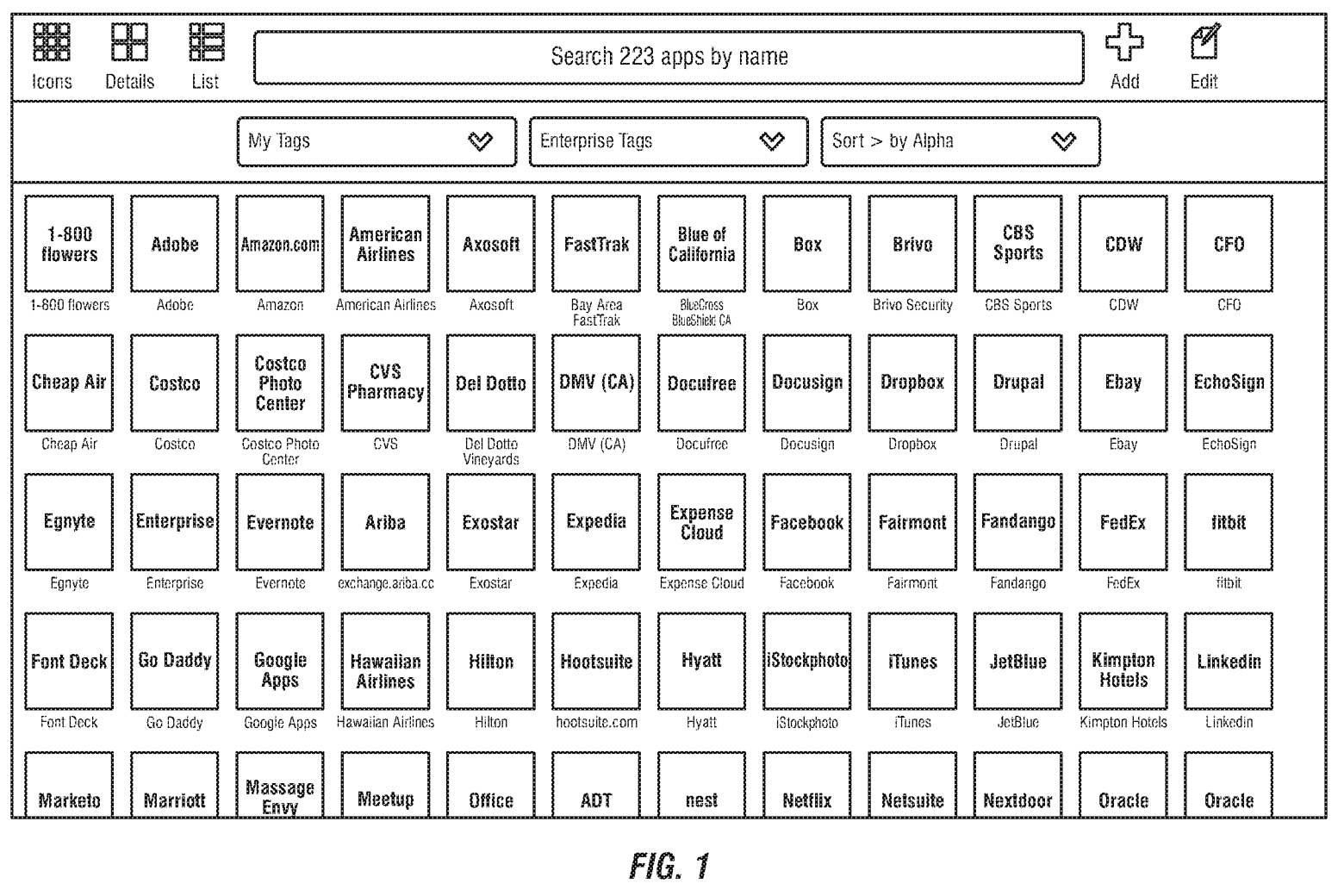

Non-exhaustive examples of web applications that can be aggregated by the server can be found in FIG. 1. FIG. 1 is a sample innovative interface of a user's page on a sSSO application, which displays a collection of web applications which the user had previously added to his sSSO application.

It should be appreciated that the aggregator platform is not limited to the social single sign-on environment. The techniques introduced herein are applicable to aggregators that allow end users to add an application, such that to link to the application at any future time, and from any device, would not need to reenter an ID and/or password. However, employing the social single sign-on implementation of the technique as discussion herein is for purposes of understanding the innovation herein and not for limiting purposes.

To access any of the user's web applications, the user registers and signs on to a social sign-on system ("sSSO") using any supported login identity provider user name and password. For example, the user can register to sSSO using his user name and password that he uses for his Linkedin account. If the user is registering for the first time, the sSSO collects additional information to verify the user later such as for a subsequent access to sSSO. For example, sSSO can collect but is not limited to collecting the user's mobile phone number, questions and answers related to information unique to the user, pictures, biometric data, and/or social information from the identity providers, such as for example information regarding friends, pictures, dates, and conversations. sSSO also automatically creates an sSSO secret user name and a sSSO secret, highly securely generated password. Both such secret user name and secret password are unknown and inaccessible to the user. In an embodiment, this secret user name and secret password are stored in an lightweight directory access protocol (LDAP) server or database or in a distributed cloud database system, etc. sSSO also maps or links the login identity provider user name to the secret user name and password of sSSO system for subsequent usage.

After the user has registered, the user can start using signal sign-on to login automatically to web applications available to the sSSO system. The login identity provider is mapped to the sSSO secret internal user name for purposes of displaying the configured SSO enabled web applications to the appropriate sSSO logged in user. In short, the sSSO secret internal user name is used to display the right apps (web applications) to the right user. Thus, for example, when the user obtains a new, upgraded smartphone, the user does not need to download and reenter the user ID and password for each of his web applications. The user can access any and all of his applications registered in the sSSO from the sSSO application.

FIG. 2 is a sample user interface showing icons representing an enabled and a not enabled SSO application. In this example, the leftmost icon, e.g. Office, represents an SSO enabled application while the icon to the right represents a web application, e.g. Office Depot, that is not enabled. In this example, the sSSO application is configured to display a visual indicator, such as the triangle with the exclamation sign inside, to indicate that such web application is not sSSO enabled.

Figure 3:
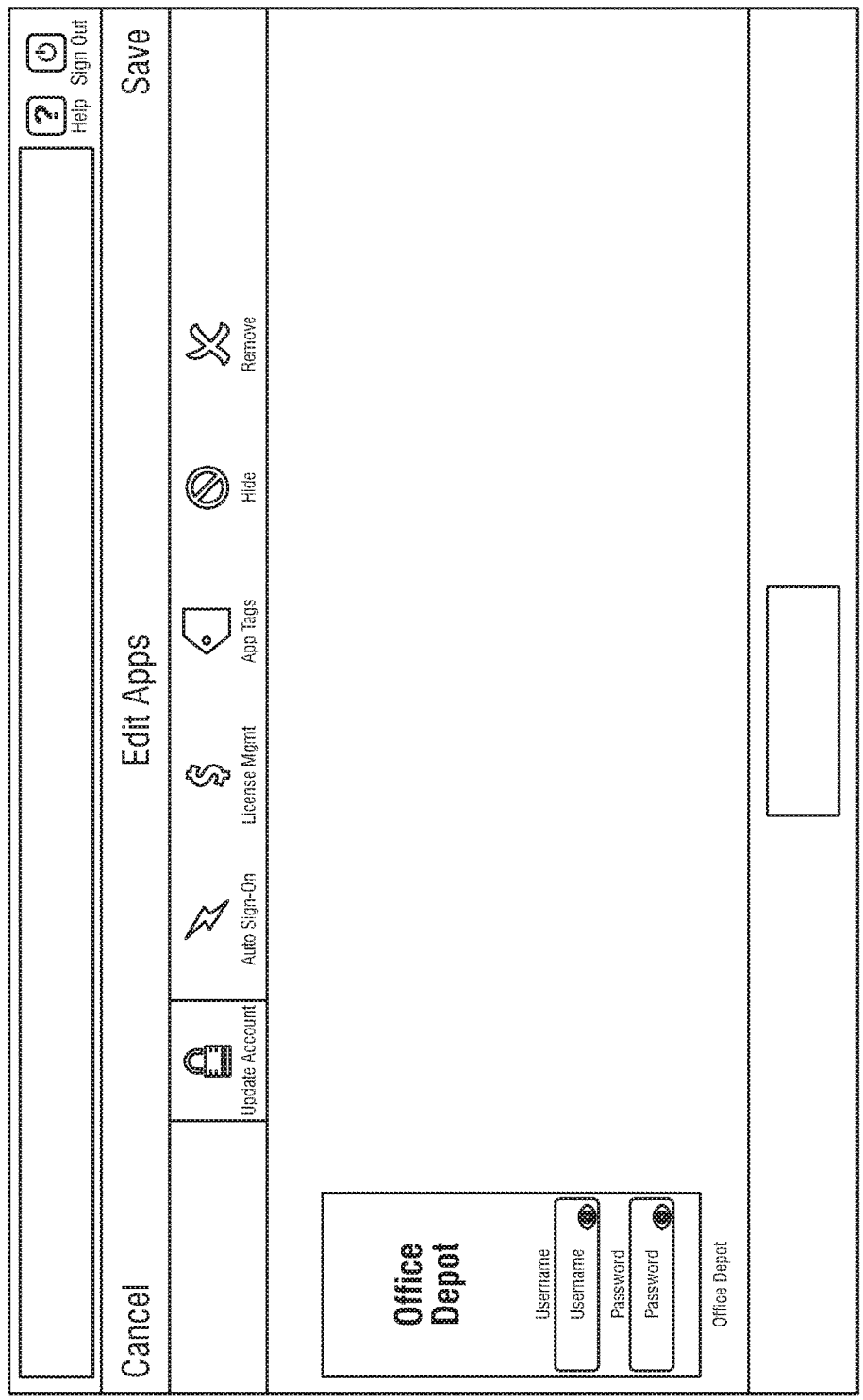
FIG. 3 illustrates an example of a user interface showing a log in graphical user interface (GUI) for a user to add and configure an organization to his aggregator platform, according to an embodiment.

In an embodiment, to enable a web application for sSSO requires entering a user name and optionally a password. An example implementation can be found in FIG. 3. FIG. 3 is a sample user interface of a registration screen to register a particular web application. In the registration screen, a user can enter his or her user name and optionally his or her password for the particular web application.

If the SSO web application, e.g. Office Depot in FIG. 3, is also a login identity provider then sSSO automatically maps or otherwise links the new login identity provider to the sSSO internal secret user name, which enables that login identity provider, e.g. Office Depot, to be used for login in purposes in addition to the existing registered login identity provider, e.g. the original sSSO system. As another example, Facebook and LinkedIn could both be login identity providers to the sSSO system assuming the LinkedIn web application was enabled for single sign-on.

If the sSSO user decides to login using a new unregistered login identity provider, e.g. Facebook, and the user never enabled that login identity provider web application for SSO, the sSSO system will attempt to identify the end user. For example, the sSSO system can go to and use a stored list of usernames and related metadata such as email addresses, actual names, etc., and display candidate selections, e.g. a list of users with similar names from the registered login identity providers, e.g. FACEBOOK: Julie@yahoo.com. That is, the sSSO system prompts the user to pick the login identity provider user name that they recognize. The login identity provider user name can be received by other input means such as for example the user entering his or her user name in a text box, audibly providing the user name, selecting an image that is recognized by the user, providing biometric data such as a finger print, and so on. In addition to using the received user input, the sSSO verifies the identity of the sSSO user by using additional registration information, that is information which was provided by the user when the user registered. For example, such additional registration information can include but is not limited to SMS, Questions/Answers, already registered login identity provider information, biometric information, etc.

Figure 4:
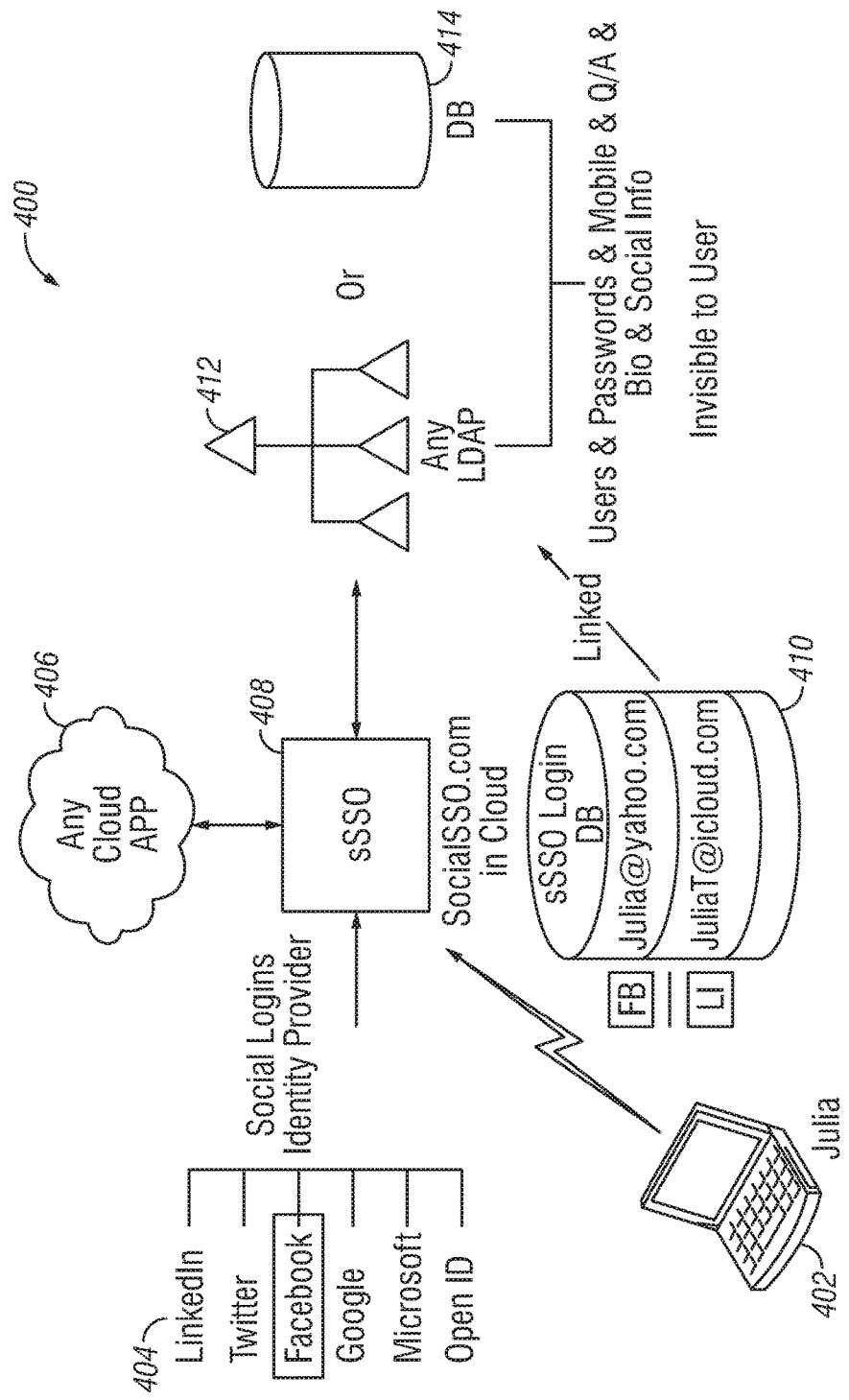
FIG. 4 is a schematic diagram of a system architecture for the aggregator platform, according to an embodiment.

An Exemplary Embodiment of Social Single
Sign-on without Username or Password from an
Single Sign-on Provider An embodiment can be understood with reference to FIG. 4. FIG. 4 is a schematic diagram of a system architecture for an aggregator platform, such as for example sSSO, without username or password from the provider, such as for example a SSO provider, 400. A user 402 logs into a social single sign-on (sSSO) application 408, e.g. such as at a website, SocialSSO.com for example, in a network environment such as in a cloud environment. A plurality of social login identity providers 404 are communicably connected with sSSO 408 such that for example a user can log onto sSSO 408 through any of these connected social logins identity providers 404. sSSO 408 is communicably connected to a repository, sSSO login database (DB) 410. In this illustrative example, repository 410 is storing two usernames associated with user 402: Julia@yahoo.com associated with her Facebook account and JuliaT@icloud.com associated with her Linkedin account. sSSO 408 is communicably connected to web applications in the cloud 406. When the user registered with sSSO 408, sSSO 408 requested additional data from the user that could be used in identifying the user at subsequent points in time. Types of such data include but are not limited to user data, passwords, mobile data, questions and answers, biometric data, and social data. sSSO 408 stores such data in a second repository 414 via a distributed directory information service over an Internet Protocol (IP) network 412 such as for example a Lightweight Directory Access Protocol (LDAP) system 412. These user names and other data stored in repository 414 and accessible via service 412 are invisible and inaccessible to the users. Thus, user 402 can login to sSSO 408 using any of her existing social usernames (as shown in repository 410) associated with the respective social login identity provider, which is linked to the user's secret data stored in repository 414. Then, after making the link, sSSO proceeds to verify the user by using any of such data in repository 414, such as for example, asking for a cell phone number or a asking a question and expecting a specific answer that matches a stored answer.

Social Federation Social Single Sign-on

Social Federation social single sign-on ("sFed") can be a system, API, or service that enables an organization such as a company, a university, or a government agency, etc. or end user to easily and securely enable an external party such as a contractor, vendor, alumni, family, friends, etc. access to internal (private) and external (public) web applications without using traditional federation technologies or manually requiring setting up a new user name and password. sFed combined with sSSO easily and securely shares web site login-related data with any user who already has a username and password on a login identity provider website.

Figure 5A:
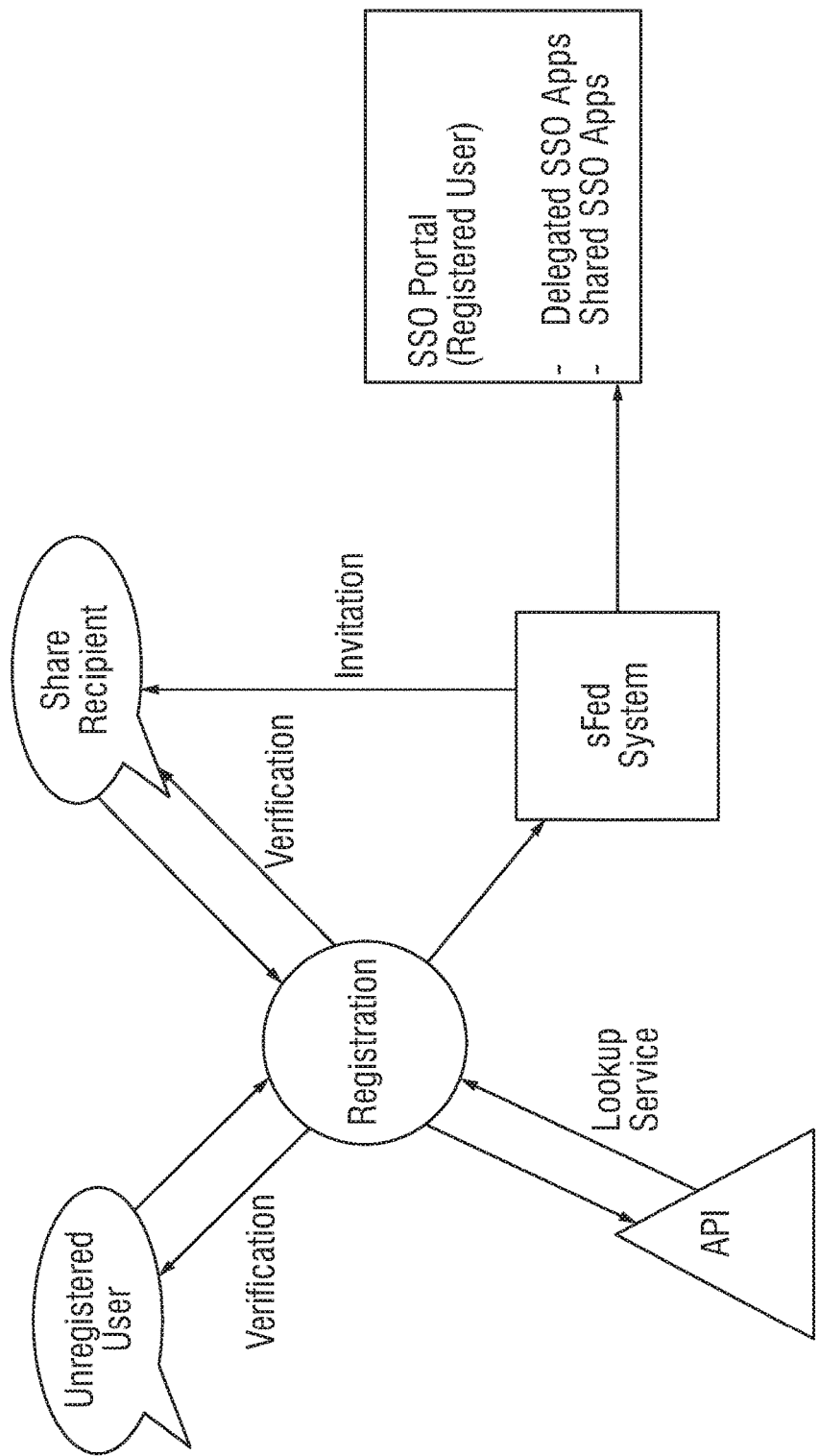
FIG. 5A is a flow diagram of a process for registration to a social federation system, according to an embodiment.

An embodiment of the invention can be understood with reference to FIG. 5A. FIG. 5A is a flow diagram of a process for registration to a social federation system. To use the sFed system requires an external party to register in sSSO or any registered sSSO user to invite an unregistered sSSO user. After they have been registered, the sFed system detects sSSO registration and registered login identity provider user name. Using the sFed system, API, or service, the organization sFed administrator or a sSSO user can delegate (share) sSSO enabled web applications to a registered user or invite an unregistered sSSO user which automatically registers the user into the sSSO system by requiring the invited user to login once to the sSSO system using a login identity provider user name. For example, FACEBOOK: Julie@yahoo.com registers on sSSO and sFed verifies her identity by sending her a SMS token, or question associated with an expected (Q/A), or requiring a biometric confirmation. Thus, in an embodiment, requiring a user to remember and enter login informational data is not needed. sSSO is configured to transmit an alert to the user, where the user can respond with identifying-related data as discussed above.

Figure 5B:
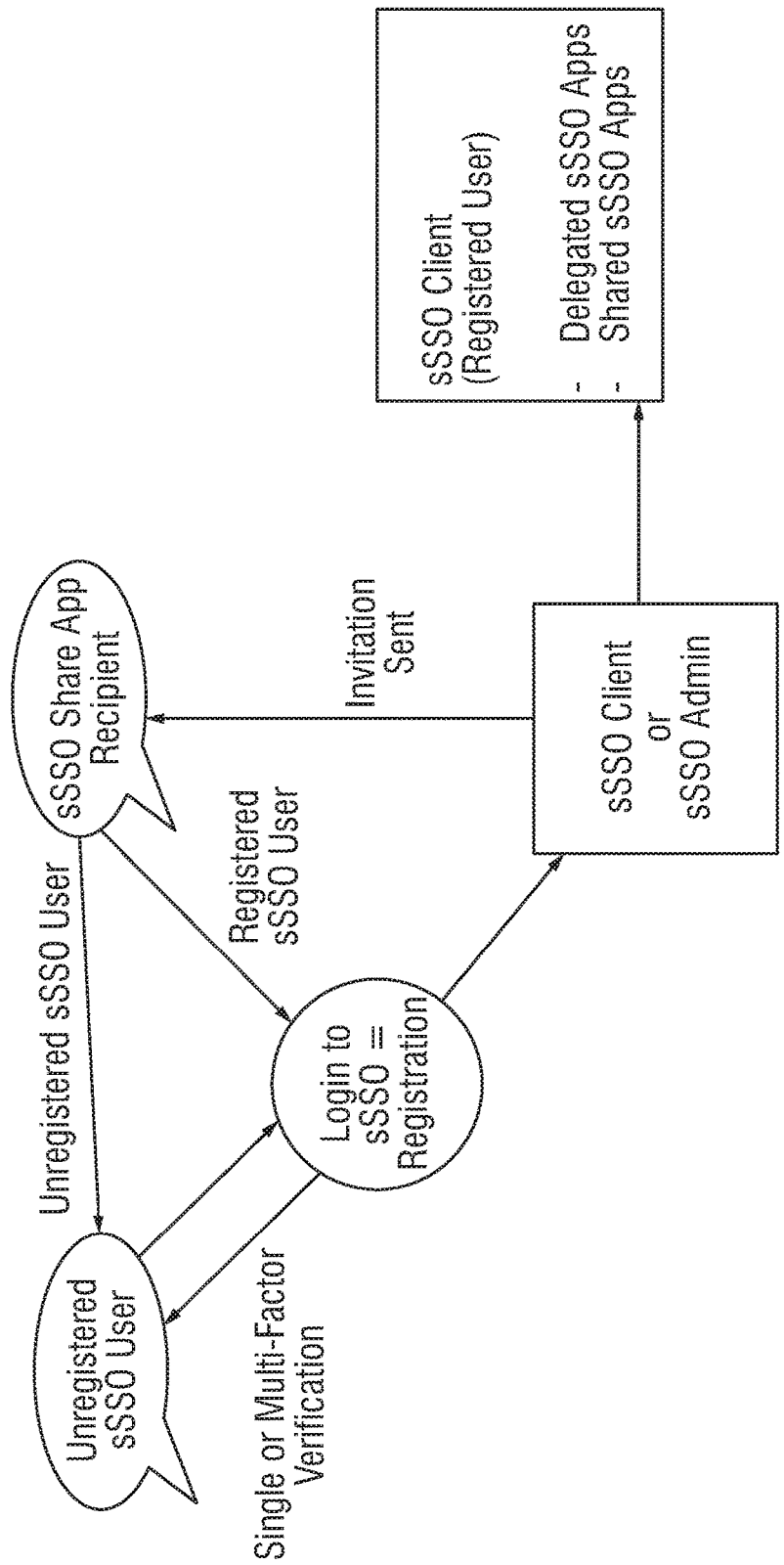
FIG. 5B is a flow diagram of a process for registration to an aggregator system, according to an embodiment.

An embodiment of the invention can be understood with reference to FIG. 5B. FIG. 5B is a process flow for registration to the sSSO system. A user such as an sSSO Client or sSSO Administrator sends an invitation to a recipient, e.g. sSSO Share App Recipient, for the purposes of sharing or delegating an application. If the sSSO recipient is already registered with sSSO, e.g. is a Registered sSSO User, then when such sSSO recipient logs in to sSSO and accepts the invitation, the delegated application is added by the sSSO system to the recipient's collection of sSSO applications. If the sSSO recipient is not yet registered with sSSO, then with the invitation, such recipient is provided the opportunity to register with the sSSO system by providing single or multi-factor verification data. Subsequently, the recipient is a registered sSSO user and the application is added to such user's collection of sSSO applications.

In an embodiment, sSSO enables a user to share login capability along with sharing an application.

Figure 6:
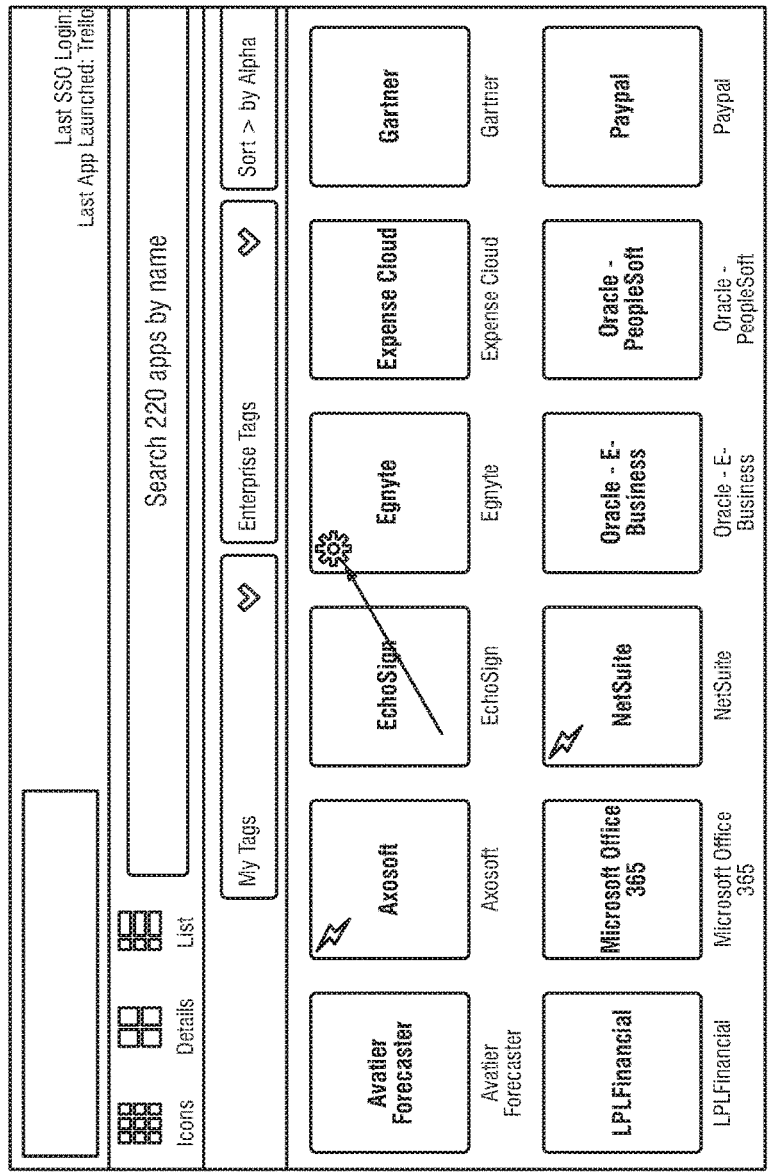
FIG. 6 illustrates an example of a user interface showing an SSO user sharing an application with an unregistered or registered SSO user, according to an embodiment.

FIG. 6 is a sample user interface showing an SSO user sharing an application with an unregistered or registered SSO user. The user initiates the process for the selected SSO application, e.g. Egnyte, by clicking on the icon.

Figure 7:
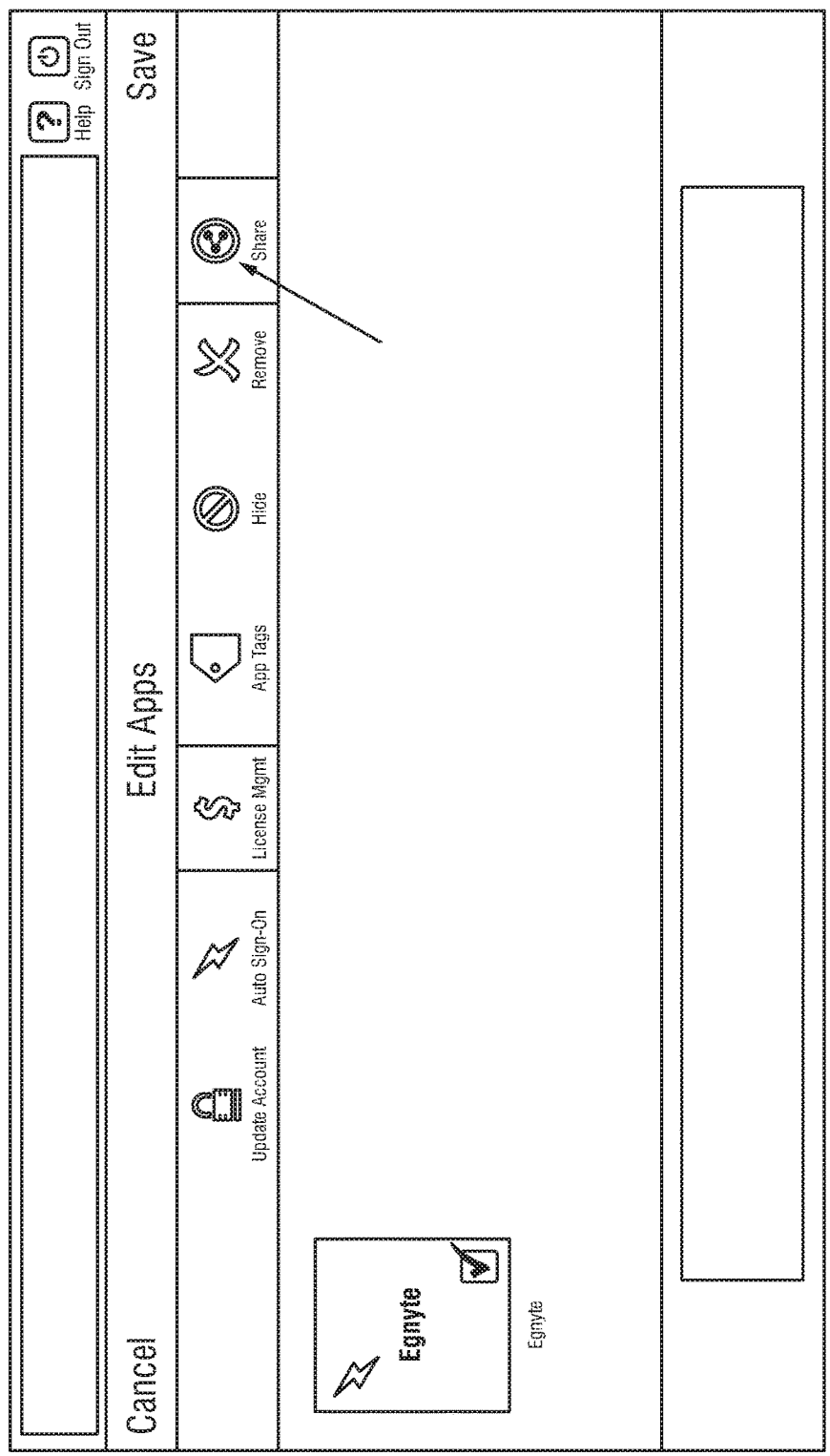
FIG. 7 illustrates an example of a user interface showing a user has selected a Share command to send to a recipient user.

FIG. 7 is a sample user interface showing a user has selected a share command to send to a recipient user. The share command can be sent via multiple methods including but not limited to email, SMS, social network, copying, etc.

Figure 8:
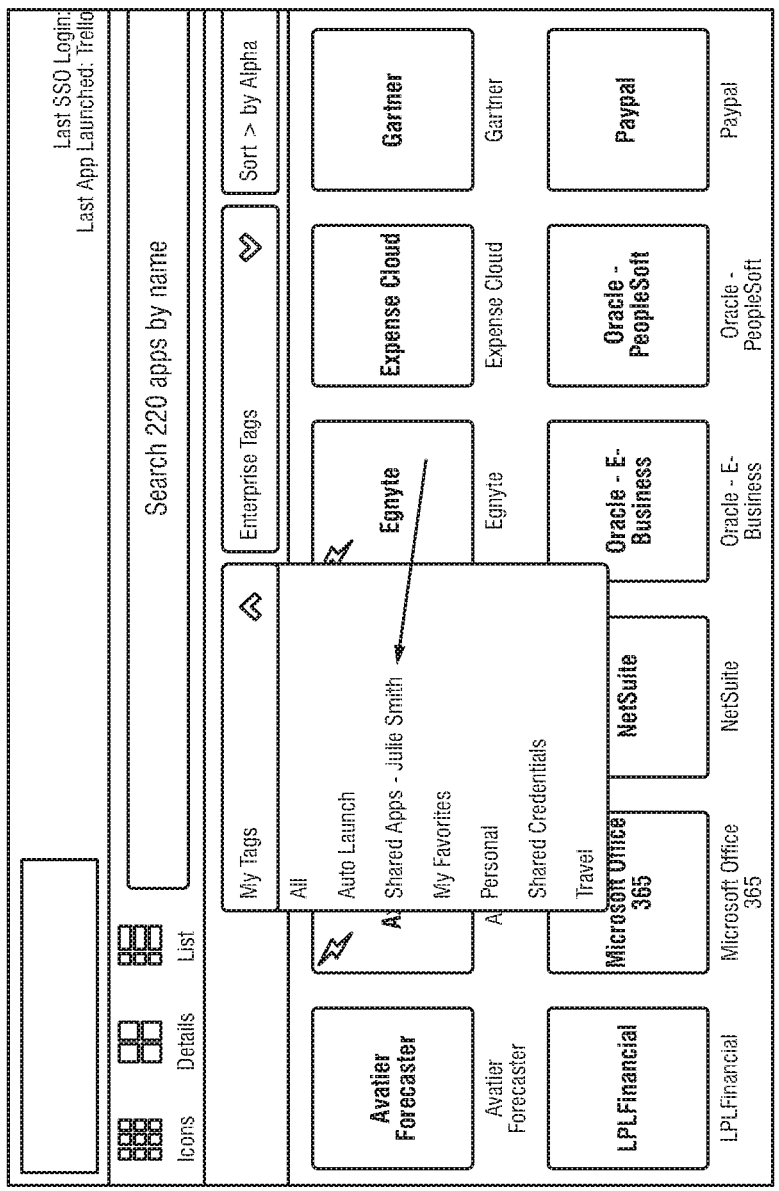
FIG. 8 illustrates an example of a user interface showing how after the SSO user proceeds with registration or log in to SSO, the system provides the user the capability of seeing his shared SSO applications, according to an embodiment.

FIG. 8 is a sample user interface showing how after the SSO user proceeds with registration or login to SSO, they subsequently have capability of seeing or accessing shared SSO applications. For example, the user can access the shared applications by selecting a drop menu that contains a link to a shared apps page. In this example, the system provides a link to shared applications for each recipient.

Figure 9:
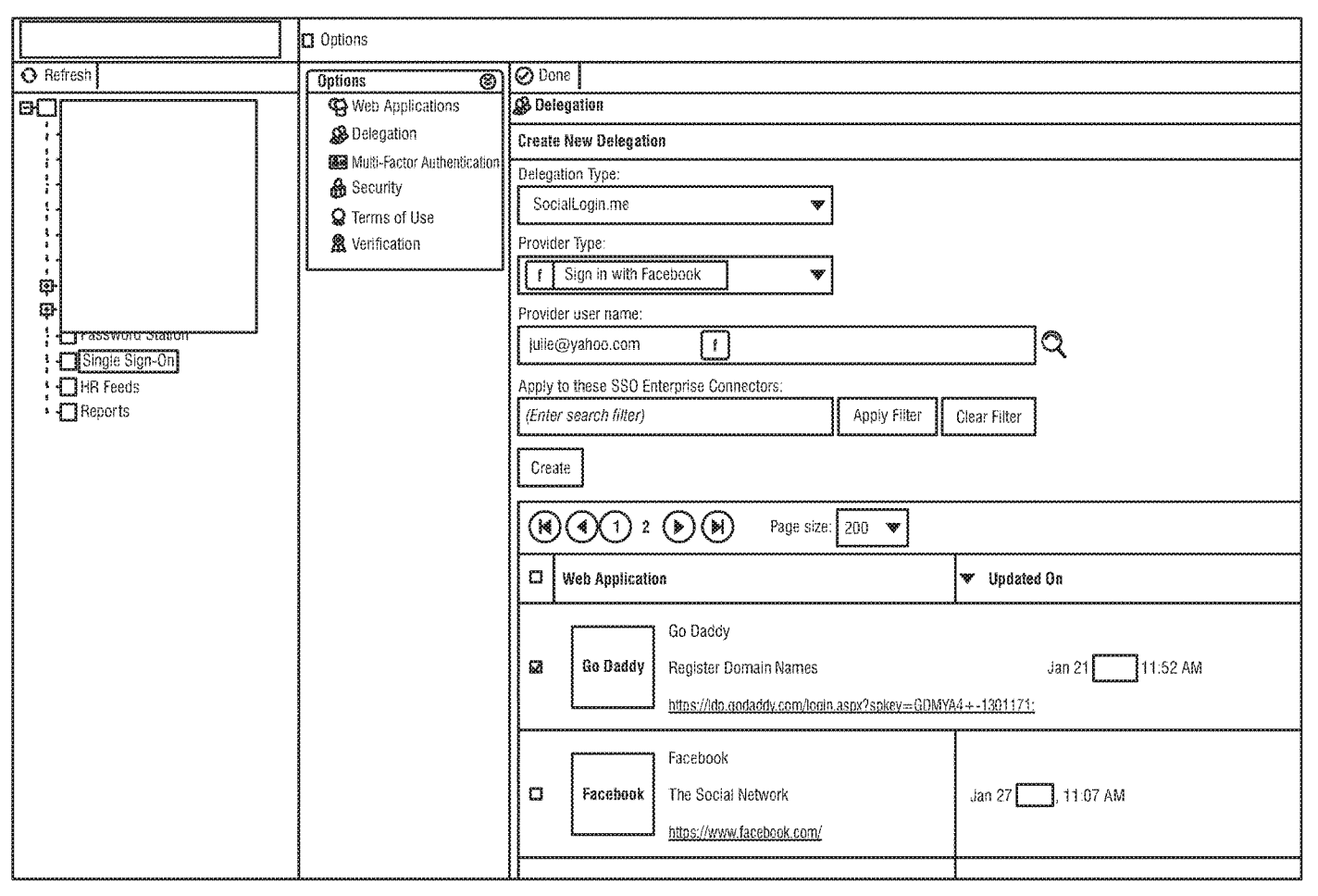

An embodiment provides a sSSO delegation administrator model and corresponding functionality. An administrator can delegate a particular sSSO user to a particular sSSO application, as shown in FIG. 9 for example. FIG. 9 is a sample user interface of a delegation page in which a user can enter a delegation type, e.g. SocialLogin.me, provider type, e.g. Sign in with Facebook, a provider user name, e.g. Julie@yahoo.com, applicable filters, and a selection of one or more applications to share, e.g. Go Daddy.

Figure 10:
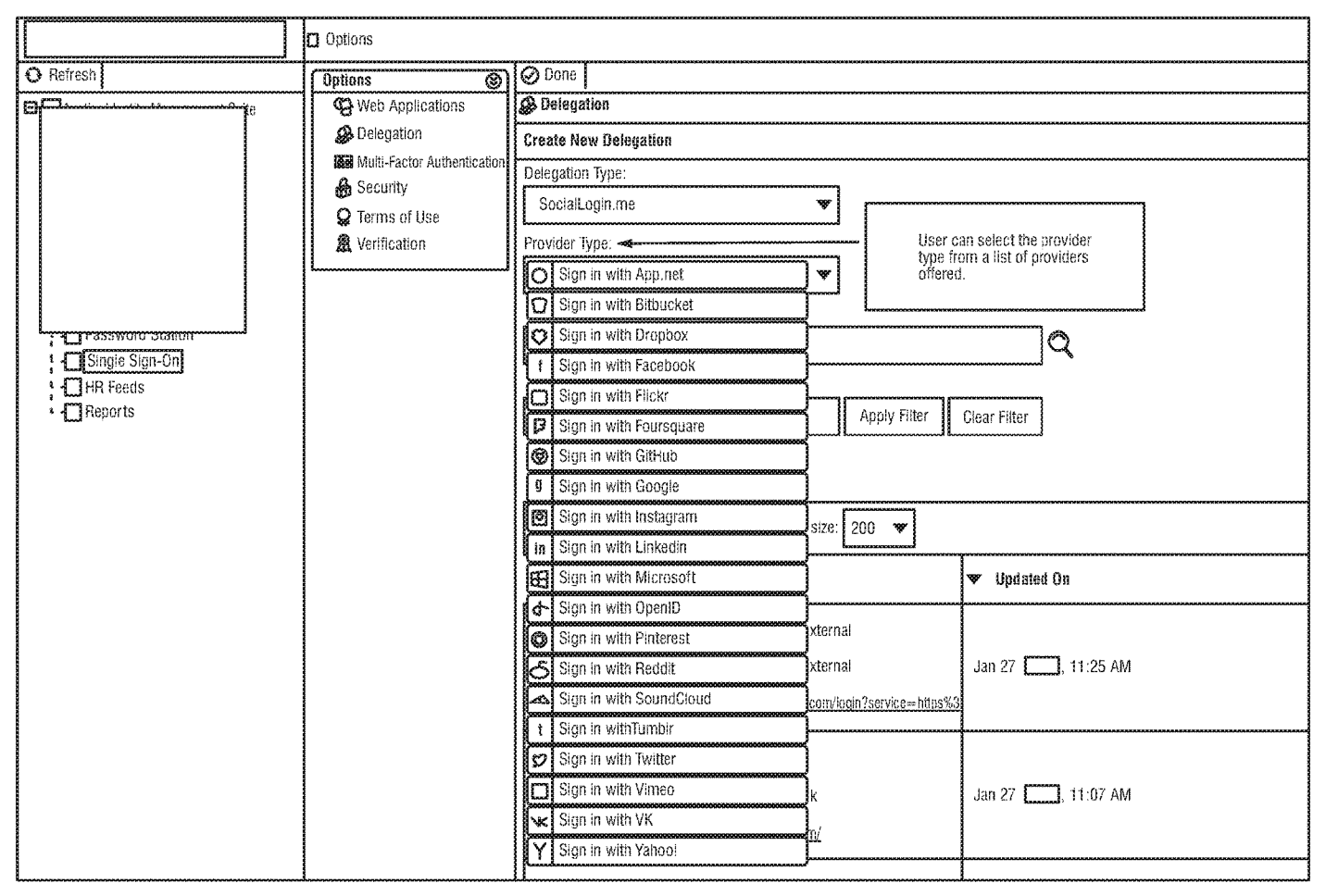

FIG. 10 is a sample user interface showing a non-exhaustive sample dropdown list of the provider types of FIG. 9, each selected type enabling the user to sign in to sSSO and/or sSSO's various enabled web applications or sSSO enterprise connected applications.

If the sFed administrator or sSSO end user is delegating (sharing) a SSO enabled web application, that is using a fixed username and password or a known user name and password to multiple people or shared within the organization to the sSSO user, then system is configured to cause the shared web application to automatically appear on the sSSO users' sSSO interface. For example, sFed uses an API or direct database calls to add the new SSO enabled web application to the user's sSSO interface.

If the sFed administrator is delegating a SSO enabled web application that is using a username and password that is unique to the sSSO user, then sFed automatically creates a user name and password on the enabled web application. For example sFed can use a format for exchanging authentication and authorization data between parties such as between an identity provider and a service provider, e.g. Security Assertion Markup Language (SAML). Or sFed can use internal methods. Then the SSO enabled web application automatically appears enabled on the sSSO user's sSSO interface.

Web Crawler for Applications Requiring Logons

A technique is introduced by which a web crawler system crawls for web applications that require logons, regardless of content. Each identified web application is added to a database, such as for example the sSSO databases 410 or 414, of such type of applications. In accordance to one technique, the web crawler system discovers a web application and then attempts to logon to the application with a bogus ID and a bogus password. If the attempt is unsuccessful, the web crawler system creates a definition for the web application, where the definition defines attributes of the web application. The web crawler system uses these attributes to categorize the web application within the database. Based on matching the categorization and user profiles, the web crawler system offers the web application to a particular user to add the web application to the user's aggregation of web applications. For instance, the web crawler system can display or send a message to the particular user indicating, "You like bicycles. Perhaps you'd like to add this bicycle application ('bikeapp.com') to your aggregated applications."

Alternate Embodiments

Figures 11, 12:
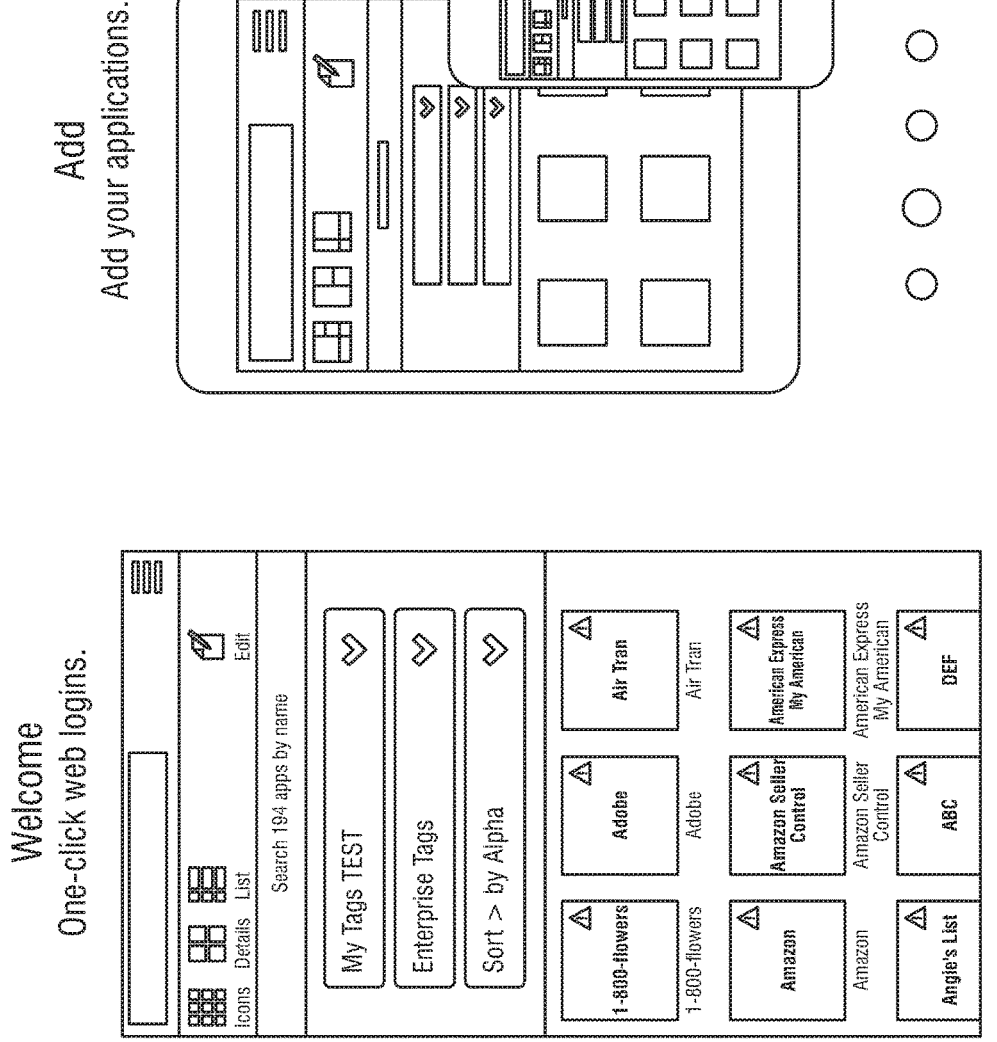
FIG. 11 illustrates an example of a user interface showing a home page of the aggregator system, according to an embodiment.
FIG. 12 illustrates an example of two different devices, a tablet and a smartphone, each displaying the home page web page of the aggregator system, according to an embodiment.
Figure 14:
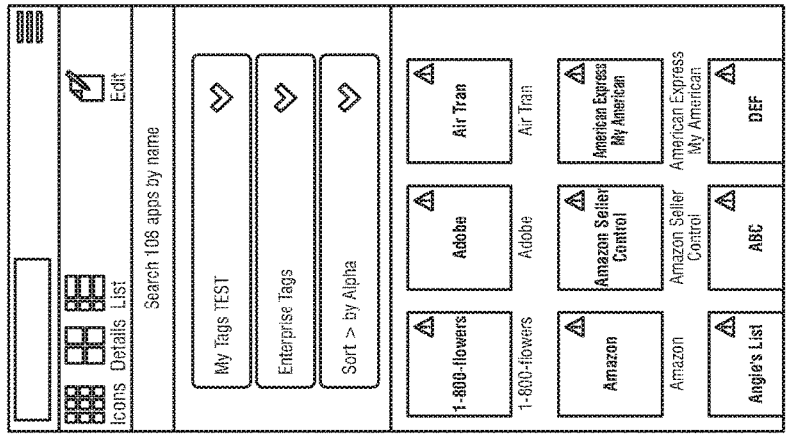
FIG. 14 illustrates an example of a user interface showing icons representing web applications which were added to the system and from which the user can launch with just one click, according to an embodiment.
Figure 13:
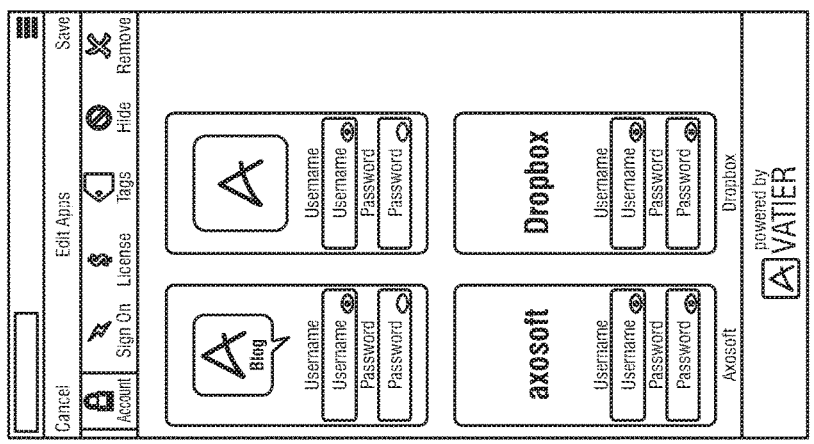
FIG. 13 illustrates an example of a user interface showing four web applications that a user can configure to add to his aggregator system, according to an embodiment.

A smartphone or tablet paradigm or environment illustrates how the innovation solves the technical problem of using computer network resources and bandwidth efficiently by streamlining user interactions with the network. FIG. 11 illustrates an example of a user interface showing a home page of the aggregator system. FIG. 12 illustrates an example of two different devices, a tablet and a smartphone, each displaying the home page web page of the aggregator system. FIG. 13 illustrates an example of a user interface showing four web applications that a user can configure to add to his aggregator system. FIG. 14 illustrates an example of a user interface showing icons representing web applications which were added to the system and from which the user can launch with just one click.

For any new device and in particular for the devices shown, the innovation streamlines user interactions with network, because the user does not need to download and reenter a user ID and password for each of the user's applications. With the technique introduced herein, the user can launch any application already registered in the aggregator platform with a single click, for instance as shown in FIG. 14.

A further efficiency, among others, is afforded the technique introduced here by enabling a user from any device the ability to login with one click to the aggregator system, e.g. as shown in FIG. 11.

A further efficiency is afforded the technique by allowing the user, in addition to launching with one click to a designated application, to add and configure a new application to his already registered applications, as shown in FIGS. 12 and 13.

An Example Machine Overview

Figure 15:
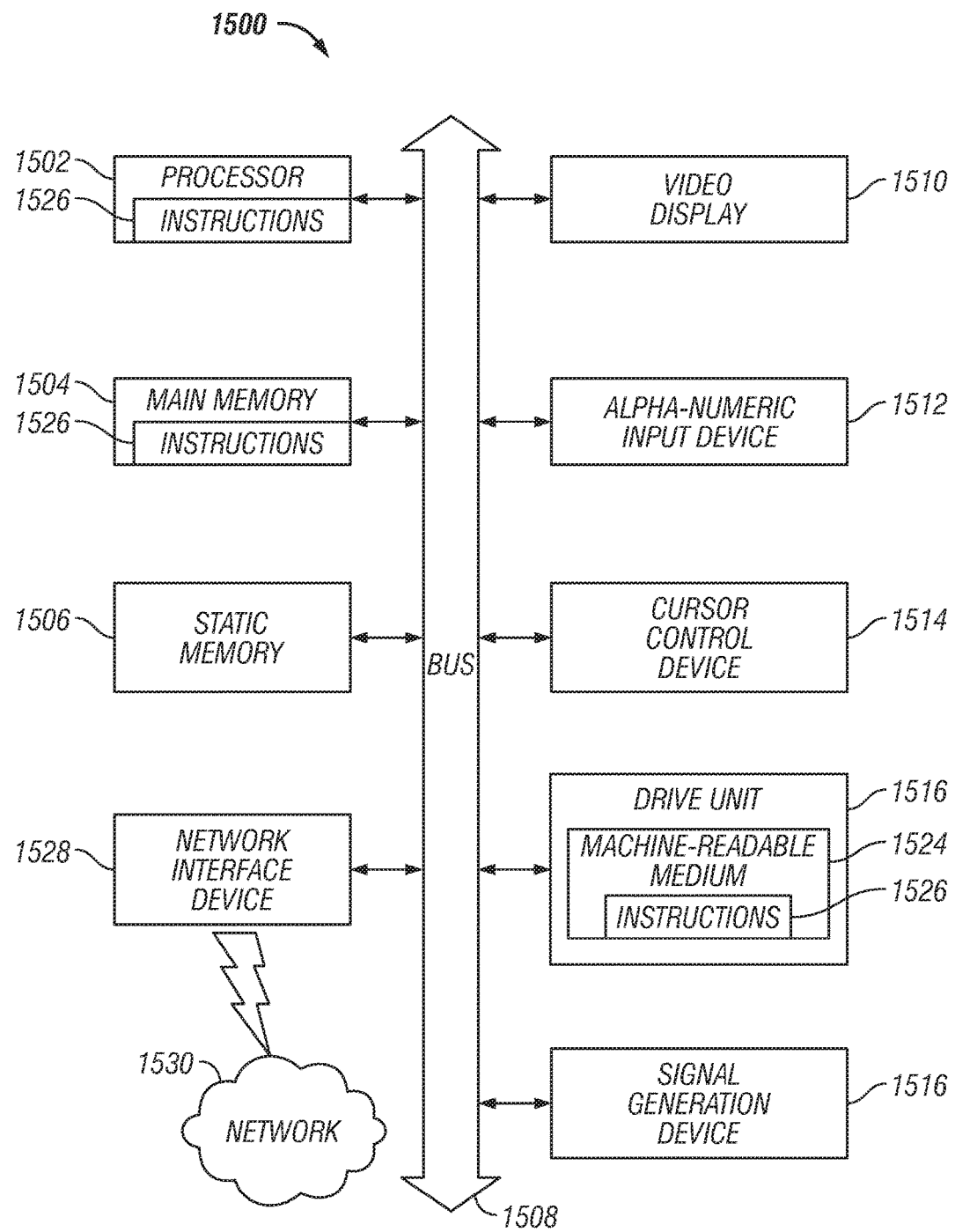
FIG. 15 is a block schematic diagram of a system in the exemplary form of a computer system according to an embodiment.

FIG. 15 is a block schematic diagram of a machine in the exemplary form of a computer system 1500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a display unit 1510, for example, a liquid crystal display (LCD) or a cathode ray tube (CRT). The computer system 1500 also includes an alphanumeric input device 1512, for example, a keyboard; a cursor control device 1514, for example, a mouse; a disk drive unit 1516, a signal generation device 1518, for example, a speaker, and a network interface device 1528.

The disk drive unit 1516 includes a machine-readable medium 1524 on which is stored a set of executable instructions, i.e. software, 1526 embodying any one, or all, of the methodologies described herein below. The software 1526 is also shown to reside, completely or at least partially, within the main memory 1504 and/or within the processor 1502. The software 1526 may further be transmitted or received over a network 1530 by means of a network interface device 1528.

In contrast to the system 1500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to login to sSSO web applications using social network identity providers or share sSSO web applications anywhere on such internet-enabled devices, servers, or clients. It further should be appreciated that one or more cloud computing embodiments include allowing a user to login to sSSO web applications using social network identity providers or share sSSO web applications using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer-implemented method, comprising:
receiving, at a computer system based on a user interaction with a user interface of the computer system, a first-time request to login to a third-party application, wherein the user is already logged into the computer system;
responsive to receiving the request to login to the third-party application, the computer system presenting a selectable indicator on the user interface to allow the user to login to the third-party application through a login identity provider, said login identity provider communicably connected to said computer system;
receiving, by the computer system, a selected login identity provider based on user interaction with said selectable indicator;
responsive to receiving said selected login identity provider, said computer system retrieving from a first storage a first user identity associated with said selected login identity provider;
responsive to retrieving the first user identity associated with said selected login identity provider, the computer system matching the first user identity to a private user identity stored in a second storage, wherein the second storage is only accessible by the computer system and wherein the private user identity was previously automatically generated by the computer system when the user initially registered with the computer system;
responsive to matching the first user identity to the private user identity, the computer system automatically generating a second user identity associated with the private user identity, wherein the second user identity is also associated with the third-party application and wherein the second user identity is used by the computer system to allow the user to login to the third party application during subsequent logins without prompting the user to re-enter authentication credentials; and
responsive to generating the second user identity, the computer system allowing the user to create a new account on or login to the third-party application.

2. The method of claim 1, wherein the computer system and the third-party application are elements of a cloud environment.

3. The method of claim 1, wherein the login identify provider is a social login identity provider and the computer system comprises a social single sign-on application and the user interface is an interface of the social single sign-on application.

4. The method of claim 1, wherein the user is already logged into the computer system by using any of: passwords, mobile data, questions and answers, biometric data, and social data.

5. The method of claim 1, wherein second repository is a distributed directory information service over an Internet Protocol (IP) network.

6. The method of claim 1, wherein the computer system is configured to invite, based on the user interaction with a user interface the computer system, a second user to share the third-party application from the user after this second user has logged onto the computer system.

7. The method of claim 6, wherein when the second user is not registered with the computer system, the computer system sending a communication to the second user, said communication allowing said second user to register with the computer system and subsequently causing the shared application to be added to a user interface of the computer system associated with the second user.

8. A system, comprising:
a processor; and
non-transitory computer-readable storage medium coupled to the processor and having instructions stored thereon, which, when executed by the processor, cause the processor to perform operations comprising:
receiving, based on a user interaction with a user interface communicably connected to the processor, a first-time request to login to a third-party application;
responsive to receiving the request to login to the third-party application, presenting a selectable indicator on the user interface to allow the user to login to the third-party application through a login identity provider, said login identity provider communicably connected to said processor;
receiving a selected login identity provider based on user interaction with said selectable indicator;
responsive to receiving said selected login identity provider, retrieving from a first storage a first user identity associated with said selected login identity provider;
responsive to retrieving the first user identity associated with said selected login identity provider, matching the first user identity to a private user identity stored in a second storage, wherein the second storage is only accessible by the processor and wherein the private user identity was previously automatically generated when the user initially was registered;
responsive to matching the first user identity to the private user identity, automatically generating a second user identity associated with the private user identity, wherein the second user identity is also associated with the third-party application and wherein the second user identity is used to allow the user to login to the third-party application during subsequent logins without prompting the user to re-enter authentication credentials; and
responsive to generating the second user identity, allowing the user to create a new account on or login to the third-party application.

9. The system of claim 8, wherein the third-party application is an element in a cloud environment.

10. The system of claim 8, wherein the login identify provider is a social login identity provider and the user interface is an interface of the social single sign-on application.

11. The system of claim 8, wherein the processor is configured to allow the user to login using any of: passwords, mobile data, questions and answers, biometric data, and social data.

12. The system of claim 8, wherein second repository is a distributed directory information service over an Internet Protocol (IP) network.

13. The system of claim 8, wherein the processor is configured to invite, based on the user interaction with a user interface, a second user to share the third-party application from the user when the second user is a registered member.

14. The system of claim 13, wherein when the second user is not registered with the computer system, sending a communication to the second user, said communication allowing said second user to register with the computer system and subsequently causing the shared application to be added to a user interface associated with the second user.

\* \* \* \* \*